United States Patent
Cho et al.

(10) Patent No.: US 7,145,498 B2
(45) Date of Patent: Dec. 5, 2006

(54) EFFICIENT AUTOFOCUS METHOD FOR SWATH SAR

(75) Inventors: Kwang M. Cho, Los Angeles, CA (US); Leo H. Hui, Alhambra, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/200,836

(22) Filed: Aug. 10, 2005

(65) Prior Publication Data

US 2006/0109164 A1    May 25, 2006

Related U.S. Application Data

(63) Continuation of application No. 10/996,246, filed on Nov. 23, 2004.

(51) Int. Cl.
*G01S 13/90* (2006.01)
(52) U.S. Cl. .............. 342/25 R; 342/25 F; 342/25 D; 342/161; 342/162; 342/196
(58) Field of Classification Search .............. 342/25 R, 342/25 D, 25 F, 161, 90, 192, 194, 196
See application file for complete search history.

(56) References Cited

U.S. PATENT DOCUMENTS

| | | | | |
|---|---|---|---|---|
| 5,184,134 A * | 2/1993 | Niho et al. | ................ | 342/25 D |
| 6,603,424 B1 * | 8/2003 | Abatzoglou | ............... | 342/25 R |
| 6,670,907 B1 * | 12/2003 | Cho | ......................... | 342/25 R |
| 6,781,541 B1 * | 8/2004 | Cho | ......................... | 342/25 D |
| 6,873,285 B1 * | 3/2005 | Carrara et al. | ............ | 342/25 R |
| 2002/0093880 A1 * | 7/2002 | Nakamura | .................... | 367/88 |

* cited by examiner

*Primary Examiner*—Thomas H. Tarcza
*Assistant Examiner*—Isam Alsomiri
(74) *Attorney, Agent, or Firm*—Leonard A. Alkov; Karl A. Vick

(57) ABSTRACT

A moving radar generates a search mode synthetic aperture image of a patch from periodic pulse returns reflected from the patch. The patch is imaged from radar returns derived from two or more overlapping arrays. A strong scatterer is located within each array, then the data from each array is motion compensated with respect to the motion of the radar and the strong scatterer. The motion compensated results for each array are autofocused to derive a phase error for each array. Using the phase error for each array, a connected phase error estimate is computed, added to the phase error of each array to minimize the differences between phases in the overlap between arrays insuring that there is no or minimal phase discontinuity in the overlap region between arrays. Avoiding phase discontinuity yields a clear SAR image of the combination of arrays rendering the patch.

12 Claims, 12 Drawing Sheets

EFFICIENT AUTOFOCUS METHOD FOR SWATH SAR

This application is a continuation in part of U.S. Patent and Trademark Office application Ser. No. 10,996,246, titled Autofocus Method Based on Successive Parameter Adjustments for Contrast Optimization, filed Nov. 23, 2004. (ref PD-03W148).

This invention was made with Government support under Contract No. F19628-00-C-0100 awarded by the Department of the Air Force. The Government has certain rights in this invention.

BACKGROUND OF THE INVENTION

1. Field of the Invention

This invention is in the field of autofocus methods for search (swath) Synthetic Aperture Radar (SAR) imaging.

2. Description of the Related Art

Synthetic Aperture Radar (SAR) is used for ground mapping as well as target identification. The general principle behind SAR is to coherently combine the amplitude and phase information of radar returns from a plurality of sequentially transmitted pulses. These pulses are from a relatively small antenna on a moving platform. As the platform moves, the information contained in the pulses is coherently combined to arrive at a high resolution SAR image.

The plurality of returns creating a SAR image generated by the transmitted pulses along a presumed known path of the platform make up an array. Theoretically, during the array, amplitude as well as phase information returned from each of the pulses, for each of many range bins, is preserved. The SAR image is formed from the coherent combination of the amplitude and phase of return(s) within each range bin, motion compensated for spatial displacement of the moving platform during the acquisition of the returns for the duration of the array.

The clarity of a SAR image is in many respects dependent on the quality of the motion compensation applied to each radar return prior to SAR image computation. Motion compensation shifts the phase of each radar sample (typically an I+jQ complex quantity derived from an analog to digital converter) in accordance with the motion in space of the moving platform with respect to a reference point. The SAR imaging process depends on the coherent, phase accurate summing of all radar returns expected within an array.

For certain applications the accuracy of the motion compensation derived phase compensation applied to each radar A/D sample is insufficiently accurate. For better phase alignment accuracy autofocus (AF) methods are used. Autofocus (AF) methods typically use information contained in the radar returns of the SAR data itself in an attempt to phase align radar return samples to accuracies better than those available from motion compensation alone. Estimated phase error derived from collected SAR data is applied to the motion compensated SAR data to improve the resulting SAR image. This SAR data driven approach for phase error estimation and compensation is generally referred to as autofocus (AF).

In addition to the spotlight mode, SAR radar can also be operated in the search (swath or strip) map mode. Spotlight mode produces two dimensional images of limited size of a limited area by steering the antenna beam to the center of the map (image) center for the duration of a frame (or array). Conversely, search mode produces image strips of theoretically unlimited length by maintaining a fixed azimuth antenna orientation during a SAR data collection period, or array. Unlike spotlight mode that typically produces images oriented in the range-azimuth direction, search mode produces images oriented in the along track and cross track direction. Uncompensated platform motion during search mode results in image smearing in the azimuth direction caused by pulse data that affects azimuth response. Because target image smears in the direction of both image axes, it is difficult to estimate and correct residual phase error for autofocus using one dimensional batch processing.

Another difficulty presented during search mode is in merging the phase error for multiple parts forming the SAR image of a patch. The boundaries where parts of the patch meet are blurred, not well defined as the phase definitions in that area are not clearly defined, unlikely to be continuous. Hence, phase errors need to be compensated for and cannot be estimated for all ground targets in a continuous manner. These individual parts of a patch need to be corrected for a continuous image. Lack of such corrections will introduce unwanted, spurious high frequency components in the resulting image thereby degrading its quality and utility.

SUMMARY OF THE INVENTION

Above limitations are reduced and SAR images are improved by a radar for generating a search mode synthetic aperture image of a patch from periodic pulse returns reflected from the patch. The radar is mounted on a platform having a motion. A first number of the periodic pulses' returns are reflected from a first array while a second number of the periodic pulses' returns are reflected from a second array. The first array overlaps the second array by an overlap amount. The overlapping first array and second array cover the patch. In general, multiple overlapping arrays cover the patch.

The radar comprises an analog to digital converter (ADC) for converting the pulse returns from the first array into a first digital array having first range bins. The same or another ADC converts pulse returns from the second array into a second digital array having second range bins.

A digital computer is used for locating a first strong scatterer within said first digital array;

locating a second strong scatterer within said second digital array;

motion compensating said first digital array with respect to said motion of said moving platform during said first digital array and said first strong scatterer to obtain a motion compensated first digital array;

motion compensating said second digital array with respect to said motion of said moving platform during said second digital array to obtain a motion compensated second digital array;

autofocussing said motion compensated first digital array to obtain a first phase error estimate over said first digital array;

autofocussing said motion compensated second digital array to obtain a second phase error estimate over said second digital array;

adding an optimizing phase to said second error estimate to obtain a shifted error estimate for said second array;

merging said first phase error estimate and said shifted error estimate over said overlap to obtain a connected phase error estimate;

applying said connected phase error estimate to said motion compensated first digital array and said motion compensated second digital array to compute an image of said patch.

A first strong scatterer is found within the first array by computing a first range bin power for each said first range bins within said first digital array and choosing one of said first range bins having the highest first range bin power among said first range bins. A second strong scatterer is located by computing a second range bin power of each second range bins within said second digital array and choosing one of said second range bins having the highest second range bin power among said second range bins.

The optimized phase minimizes the difference between said first error estimate and said second error estimate over said overlap using a least square criterion. In one embodiment, the overlap contains a number of pulses in said first array, as well as the same number of pulses in said second array, typically more than 10 percent of the number of pulses making up the first array.

DETAILED DESCRIPTION OF THE INVENTION

The present invention describes a method for improving search type SAR images of a patch using overlapping arrays covering the patch.

SAR images require accurate phase alignment of the reflected pulses to achieve the in-phase combination of the information contained therein. Phase errors arise from navigation data inaccuracies from motion compensation, or from atmospheric effects on radar returns causing de-focusing of SAR images. The methods used to compensate for these type of errors, is called auto-focus (AF). AF depends on information contained in motion compensated radar collected data to perform relatively fine, accurate phase correction not originally provided by motion compensation.

Unlike the case in spot SAR mode, processing for AF in search SAR mode requires continuous estimates of phase errors so multiple SAR arrays can be combined into a large patch. Furthermore, images generated in search mode are oriented in the along-track, cross track direction, unlike spot mode. The best mode embodiment described herein performs AF prior to batch processing using images formed by the Polar Format Algorithm (PFA). Successive Parameter Adjustment (SPA) is used for the estimation of phase error in each AF array. A preliminary area search is performed to select an area in the image having a strong return. AF images for the estimation of high order phase error by SPA are formed using PFA to align the data in time in aperture (azimuth frequency) domain without using azimuth deskew function. Separate phase error estimates for each array are merged to obtain a composite phase error to be applied to all arrays forming a patch.

Figure 1:
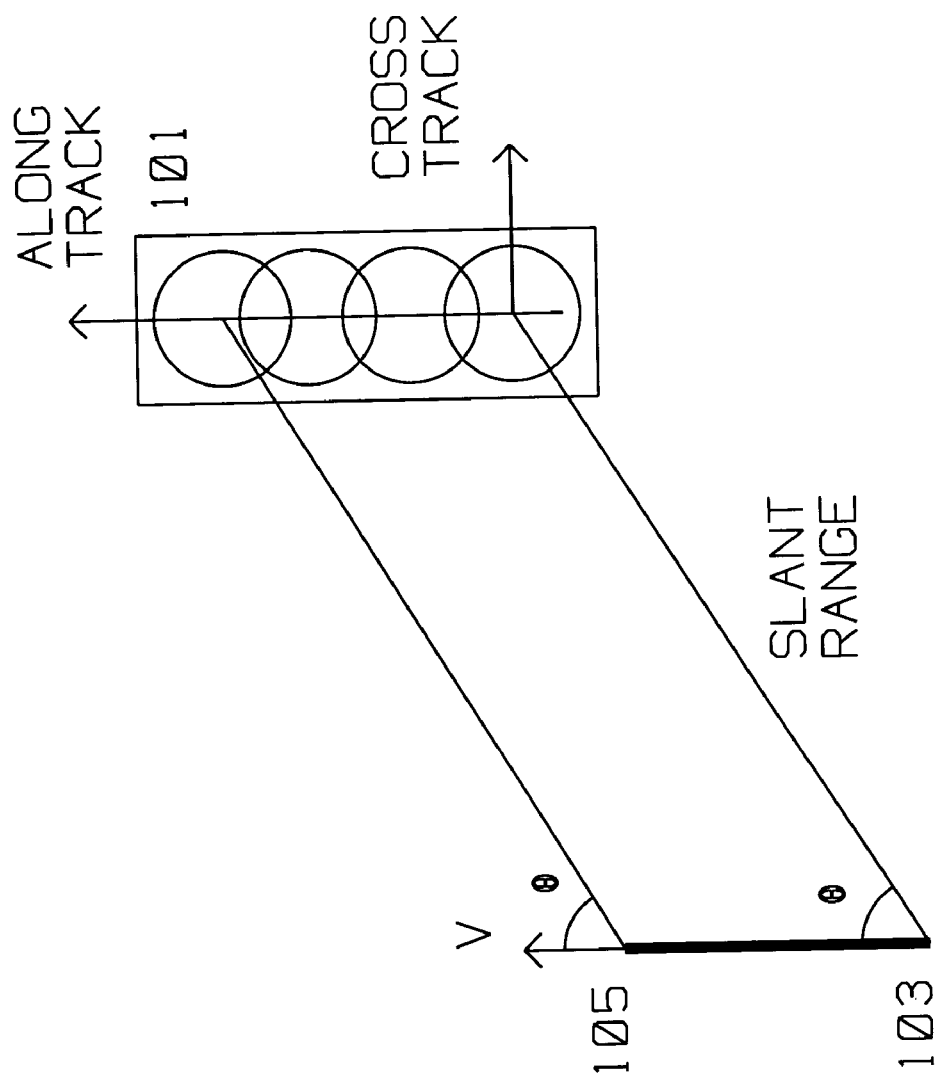
FIG. 1 is a SAR swath configuration of the prior art

FIG. 1 shows the typical prior art geometric relationship between a moving platform carrying a radar transmitter/receiver using Synthetic Aperture (SAR) search methods imaging patch 101 by said radar transmitter/receiver. The moving platform is initially at position 103, travels with velocity V in the direction shown to position 105. In SAR search (or swath) mode, the SAR antenna azimuth is fixed at azimuth angle θ oriented towards patch 101 as the platform moves with velocity V. The moving platform moves from position 103 to position 105, while maintaining a fixed angle θ so that the antenna illuminates portions of patch 101 as it progresses. Radar pulses are transmitted and corresponding returns received at many points during the arrays collected between position 103 and position 105. The search types of SAR radar are well known in the art and are described, for example, by J. C. Curlander, et al, in *Synthetic Aperture Radar: Systems and Processing*, Wiley, 1991, (hereinafter identified as Reference 1), incorporated herein be reference in its entirety.

Motion compensation is the process of digital correction of radar phase error for each radar return in a SAR frame forming a SAR image due to the change in position of scatterers relative to the moving platform as it acquires radar returns. The motion of the moving platform with respect to a focus point is typically measured using accelerometers coupled to GPS/INS systems. Motion compensation is performed in an airborne digital computer (processor) on each I/Q sample of a radar return. The exact form of motion compensation depends on the method used to compile the SAR image from the radar returns. Residual phase error is the phase error present after motion compensation has been taken into account. Residual phase error from various sources, such as uncompensated sensor motion or atmospheric effects, results in degraded SAR image quality. The reduction of uncompensated phase error over a whole (search) patch is the goal of this embodiment.

1) Autofocus Overview for SAR Search Mode and Data Take

SAR search mode is different from spotlight mode. Spotlight mode generally produces images oriented in the range and azimuth direction. In search mode, the image is in the along track and cross track direction. Imperfections in motion compensation will smear the resulting image in both axes. Thus, smearing is the result of two sources of errors, one corresponding to each axis. Because of error contribution from both axes, it is difficult to estimate and correct the residual, post motion compensation errors using one dimensional processing.

Search mode phase error can be estimated and corrected in the batch processing stage of image formation. That is, pulse to pulse processing is done as the data is acquired and the autofocus is implemented at a later time. An example of autofocus processing is described in U.S. Pat. No. 6,781,541, issued Aug. 24, 2004, incorporated herein by reference in its entirety. Unlike the '541 patent, the present method and apparatus describes a phase correction method to be computed prior to batch processing.

A challenge in search mode autofocus is merging the phase error segments estimated using two or more AF arrays which are the overlapped subsets of a search patch. Phase errors that need to be compensated cannot be estimated for all targets on the ground in a continuous manner. Therefore, phase errors are estimated for groups of pulses using AF patches, and then are properly connected for a continuous stream of phase error correction to be applied to all collected pulses descriptive of the patch image. It is necessary to make smooth connections of separate subsets of the image, i.e. AF arrays, by merging estimates in the overlapped common period to avoid high frequency noise in the final image. Constant and linear phase estimated correction terms are introduced so that the overlapped portion between consecutive phase error segments are optimized using a least square criterion, considering that estimated phase error from each AF array does not include terms lower than quadratic. Complete compensation of platform motion error cannot be computed solely by the AF function since such compensation requires estimation of angle error as well as the delay or phase error. Thus the AF function estimates and corrects phase error only to improve image quality. Image shifting and re-scaling can also be computed without the application of an AF function. Therefore, image smearing can become better or worse depending on the type of motion error encountered in the acquisition of the radar data when phase error is corrected using any AF methods. One AF method is that suggested by D. E. Wahl, et al, *New Approach to Strip Map SAR Autofocus*, Digital Signal Processing Workshop, 1994, Sixth IEEE, Oct. 2–5, 1994, pgs 53–56, incorporated herein by reference in its entirety.

Figure 2:
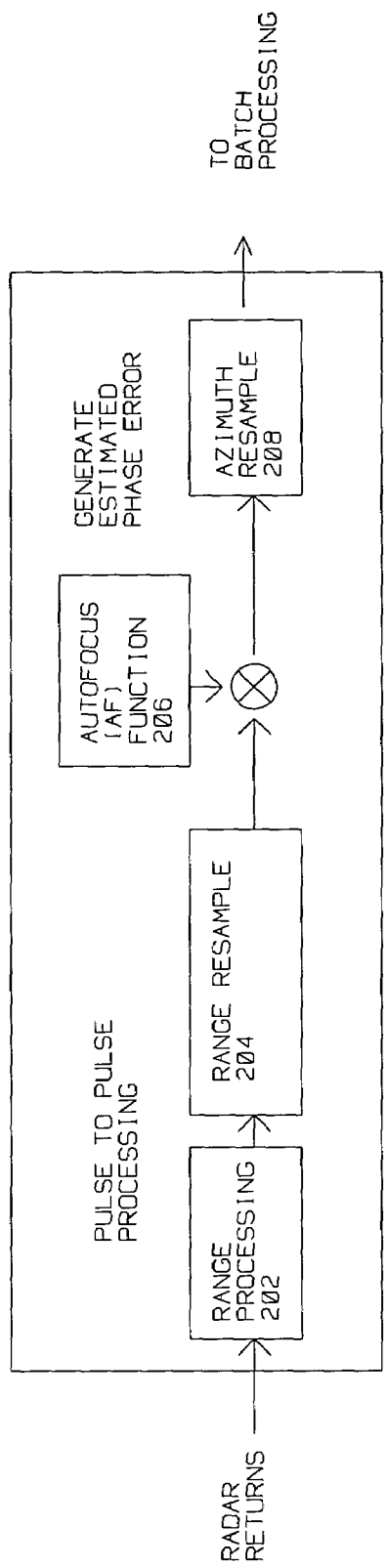
FIG. 2 shows a pulse to pulse processing in a preferred embodiment

Search mode SAR processing is divided in two processing stages: Pulse to Pulse and batch processing for the SAR image. FIG. 2 shows where the method herein is applied in a typical search mode image formation chain. Input to the AF function is sampled data in range for all collected pulses. Range compression 202 removes the quadratic phase component in each received pulse when the transmitted pulse uses linear frequency modulated (LFM) waveform. The results are sent to range Resample 204. $\Delta\Phi_{AF}$ generated by the autofocus (AF) function 206 is the estimated error included in the collected radar returns. This estimated error is compensated before Azimuth Resample 208 is computed.

Figure 3:
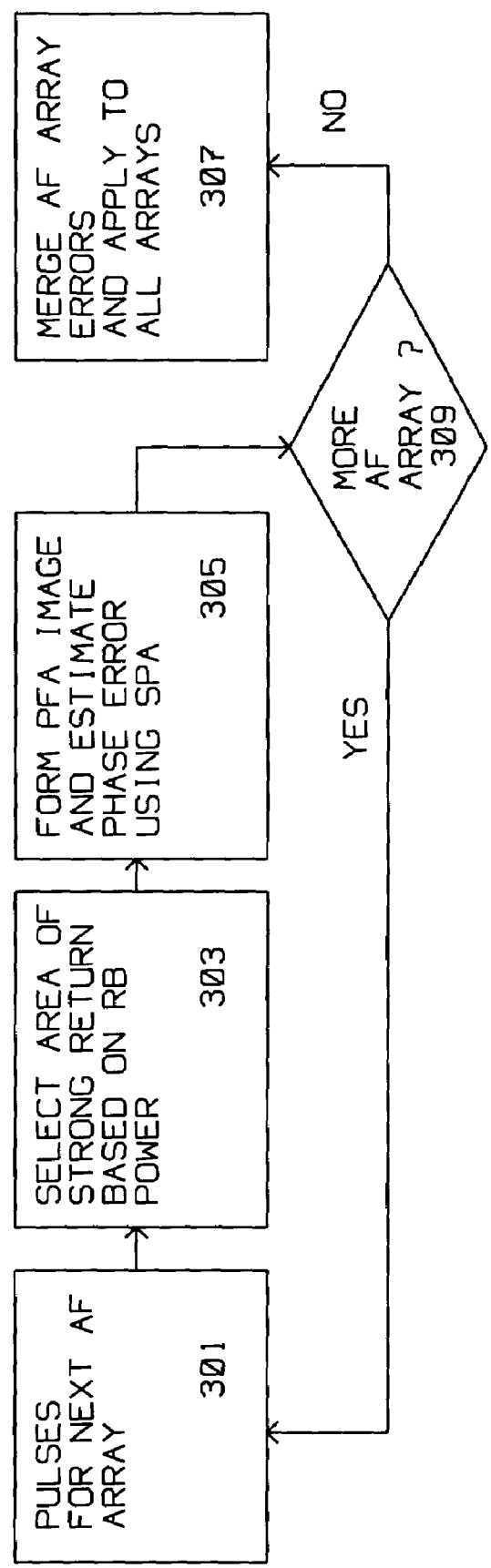
FIG. 3 shows the merging of a plurality of arrays to yield the image of a patch.

The AF calculation of $e^{-j\Delta\Phi_{AF}}$ is performed as shown in FIG. 3. Before starting the major AF processing steps, radar returns for each AF array representing a portion of the overall search image are selected in Take pulses for AF array 301. Radar return collection applicable to this method is shown in FIG. 4 including parameters used to derive AF estimated phase error.

Figure 4:
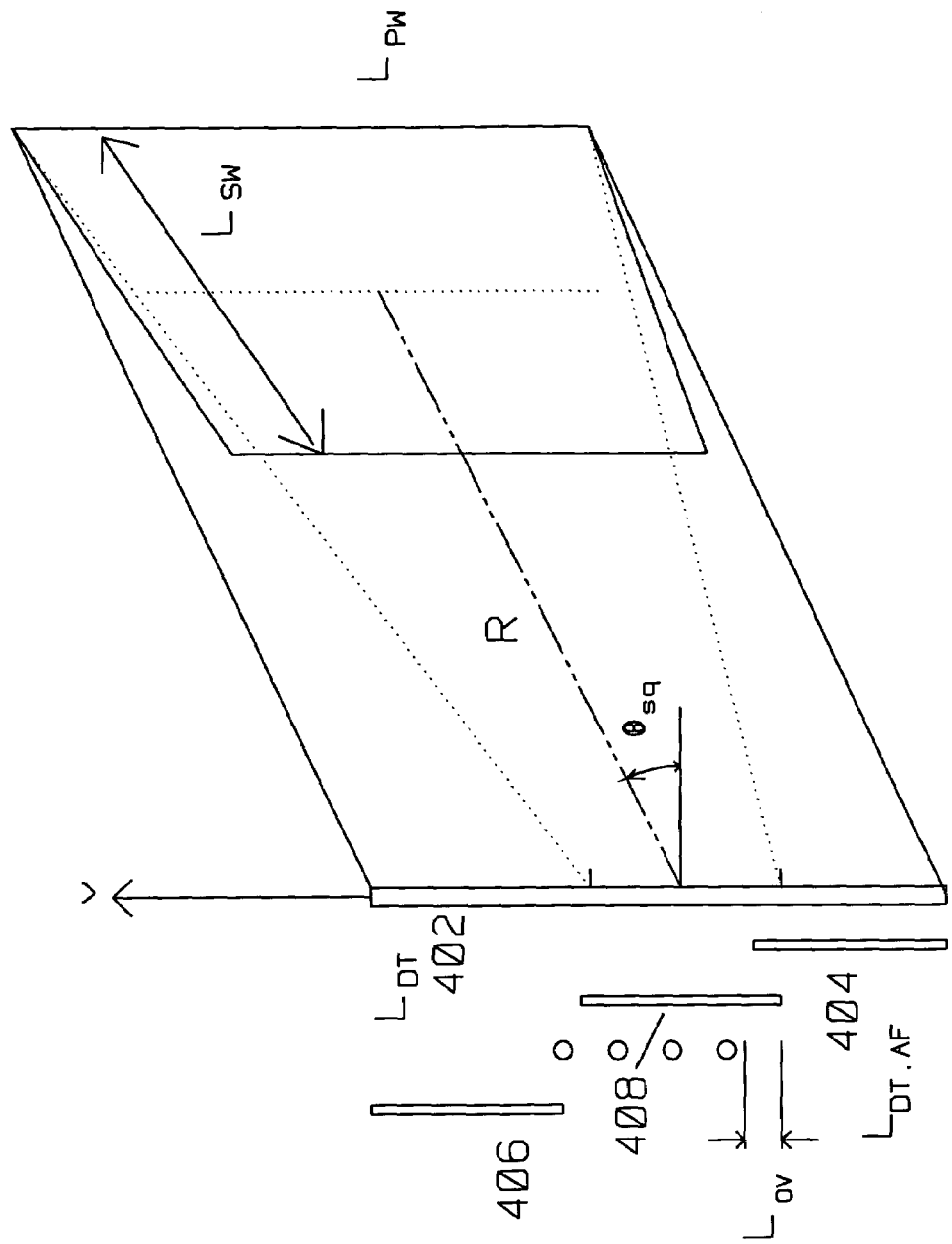
FIG. 4 shows the geometry of a plurality of arrays with respect to the patch.

In FIG. 4, $L_{DT}$ the length of a data take for a patch 402, is determined from the desired AT resolution $\delta_{AT}$ and the width of the image patch in azimuth $L_{PW}$. The data take is is divided for a patch into two or more $N_{AFA}$ autofocus arrays such as 404, 408 . . . 406 so that combined phase error estimates can be applied to the pulses of length $L_{DT}$ when $N_{AFA}$ phase error estimates are completed. Denote the array length of an AF array and overlapped portion by $L_{DT,AF}$ and $L_{OV}$ respectively. Then, using the overlap ratio $$r_{OV} = \frac{L_{OV}}{L_{DT,AF}}$$

$L_{DT,AF}$ is calculated from $$L_{DT,AF} = \frac{L_{DT}}{N_{AFA} - r_{OV}(N_{AFA} - 1)}$$

AF arrays are used to form AF images oriented in the range and azimuth direction. The size of the AF image in azimuth with the squint angle $\theta_{sq}$ is calculated for the desired azimuth resolution $\delta_{AZ}$, wave length $\lambda$, mapping range R and main lobe broadening factor k:

$$L_{PW,AF} = \left(L_{DT,AF} - \frac{kR\lambda}{2\delta_{AZ}\cos\theta_{sq}}\right)\cos\theta_{sq}$$

The number of pulses $N_{AFA}$ in each AF array are calculated from $L_{DT,AF}$ using $$N_{AFA} = \frac{L_{DT,AF} \cdot PRF}{v}$$

for platform velocity v. When platform velocity changes significantly during data collection for a patch, the number of pulses for each AF array are kept constant. The AF array is not fixed.

2. Selecting an Area with a Strong Return

Figure 5:
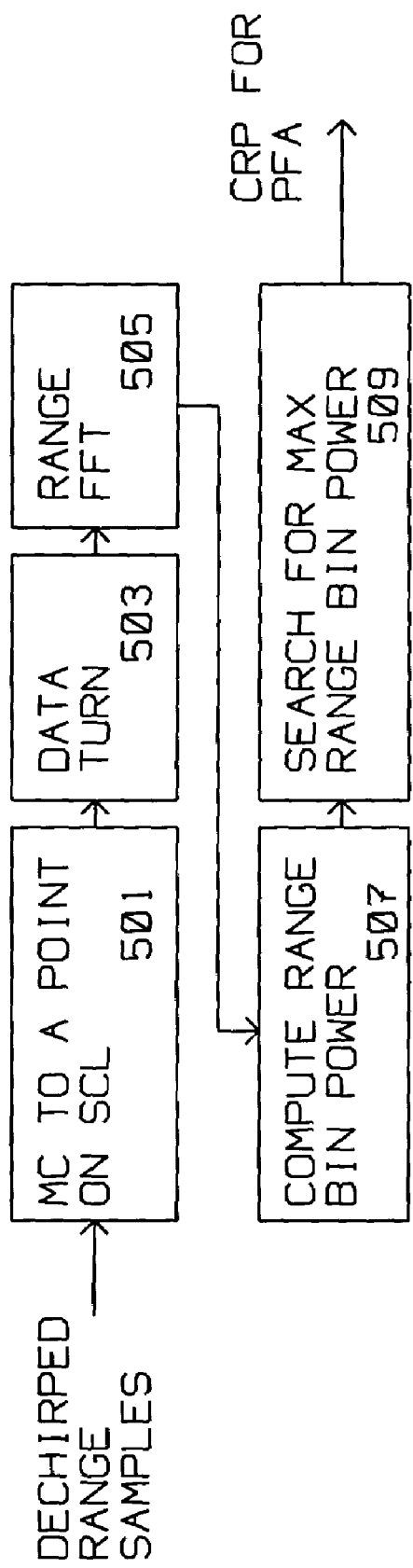
FIG. 5 shows the processing of dechirped range samples to find a Central Reference Point (CRP) for a particular array.
Figure 6:
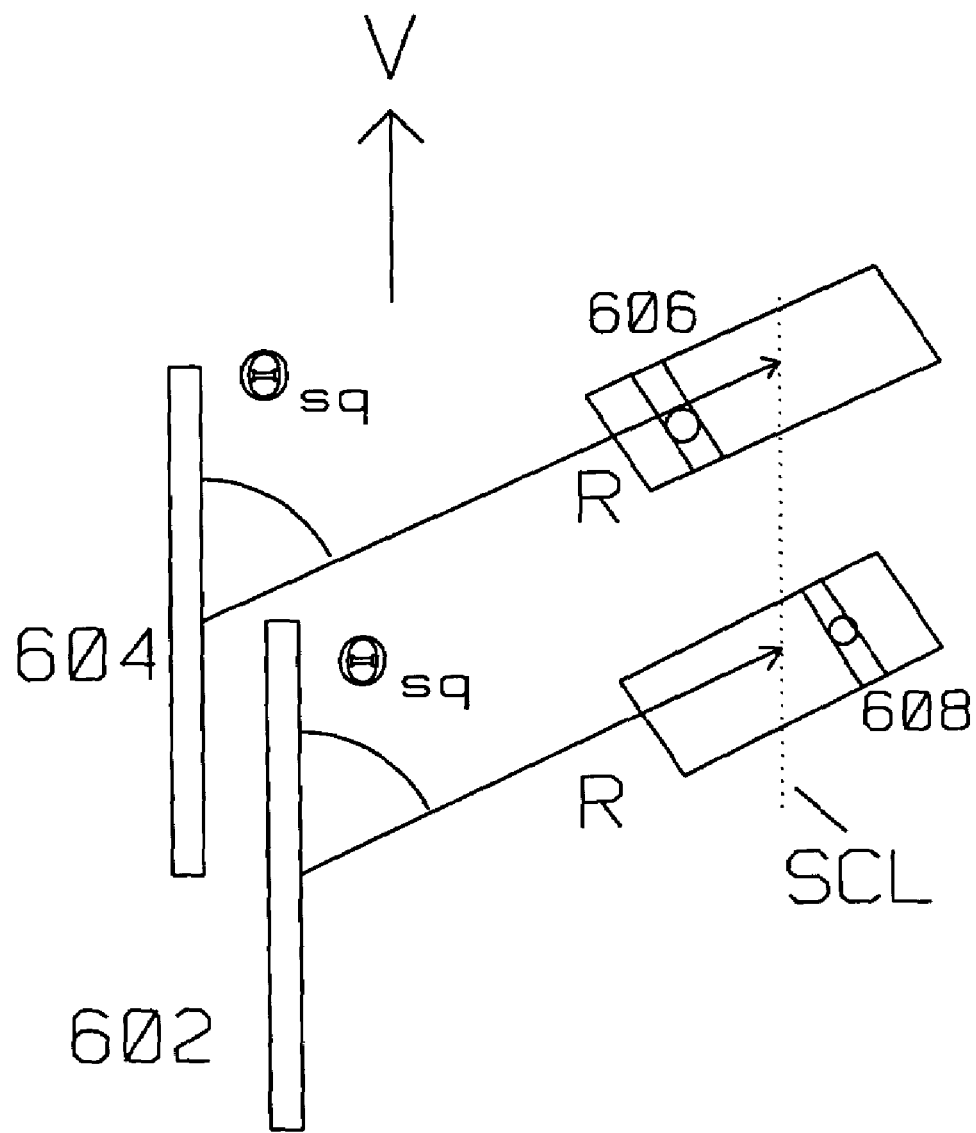
FIG. 6 shows the geometry of overlapping arrays covering a patch, each array having a strong range bin with a target suitable for use as a CRP.

SPA is the method used herein, and it is based on contrast optimization. It is a preferred in this embodiment for imaged areas having high radar energy reflectivity. Areas of low radar energy reflectivity include lakes and terrain masked or shadowed by adjacent hills, mountains or other features. As shown in FIG. 5, dechirped range samples (chirping refers to linear frequency modulation of the transmit pulse) are motion compensated (MC) with respect to a point on the scene center line (SCL) in MC To A Point On SCL 501. The MC point is determined by the squint angle $\theta_{sq}$ and range R for each AF array as shown in FIG. 6. Data turn 503 is for the reduction of output samples. Range FFT 505 converts the range bin data into the image (frequency) domain. Azimuth FFT is not required for the calculation of range bin power. Compute Range Bin Power 507 computes the amount of radar return energy in each range bin within a particular array. The range bin at a particular azimuth with the strongest return, that is, the highest range bin power, provides the coordinates of the Central Reference Point (CRP) utilized for image formation using PFA as described below.

In FIG. 6, array 602 gathers data around SCL where range bin 608 has a strong scatterer. Array 604, overlapping array 602, also gathers data around SCL, and has a strong scatterer at range bin 606. The platform gathering the data moves along with velocity V.

3. Phase error Estimation Based on SPA Using Images Formed by PFA.

Phase error for each array is estimated using one of many available AF techniques. In one embodiment, a technique called Successive Parameter Approximation (SPA) is used, described in the parent application, Ser. No. 10,996,246, titled Autofocus Method Based on Successive Parameter Adjustments for Contrast Optimization, filed Nov. 23, 2004. This technique was found robust for this preferred embodiment as it does not rely on point like targets that are typically used for the Phase Gradient Autofocus method (PGA) described by D. E. Wahl, et al, in *Phase Gradient Autofocus—A Robust Tool for High Resolution SAR Phase Correction*, IEEE Trans. Aerosp. Electron. Sys, vol 30, pp 827–834, March 1994.

Figure 7:
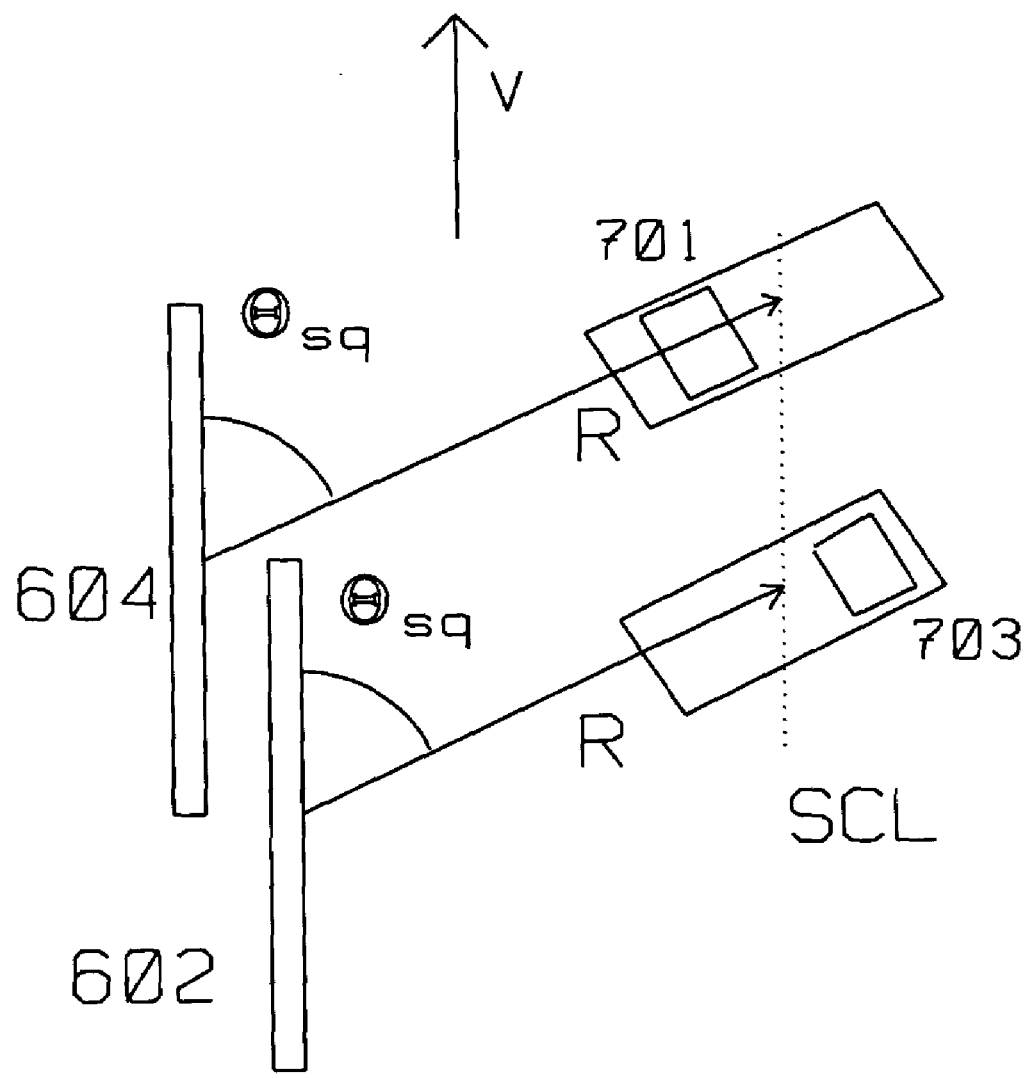
FIG. 7 shows the geometry of overlapping arrays covering a patch where the CRP found in FIG. 6 is used to form an image in the vicinity of the CRP.

SPA, as used in this preferred embodiment, estimates the coefficients of the Legendre Polynomial that is used for the approximation of the phase error through iteration loops to maximize the image contrast measured by entropy. To use SPA, the image is formed using one of the image formation algorithms such as PFA or Range Migration Algorithm (RMA). However, phase histories of targets that are displaced in azimuth from the image formed by RMA are not aligned in time. Thus azimuth deskew is used to align the phase histories in time as described in U.S. Pat. No. 6,670,907, to K. M. Cho, Dec. 30, 2003. To avoid using an azimuth deskew function, PFA is used in the preferred embodiment instead of RMA. Area of the formed image around the CRP locations that are found to have strong range bin returns, as discussed with respect to FIG. 6, are shown in FIG. 7 prior to applying SPA. In FIG. 7, area 703 covered by array 602 has been motion compensated with respect to the strong scatterer found in range bin 608. Similarly, area 701 covered by array 604 has been motion compensated with respect to the strong scatterer 606.

Figure 8:
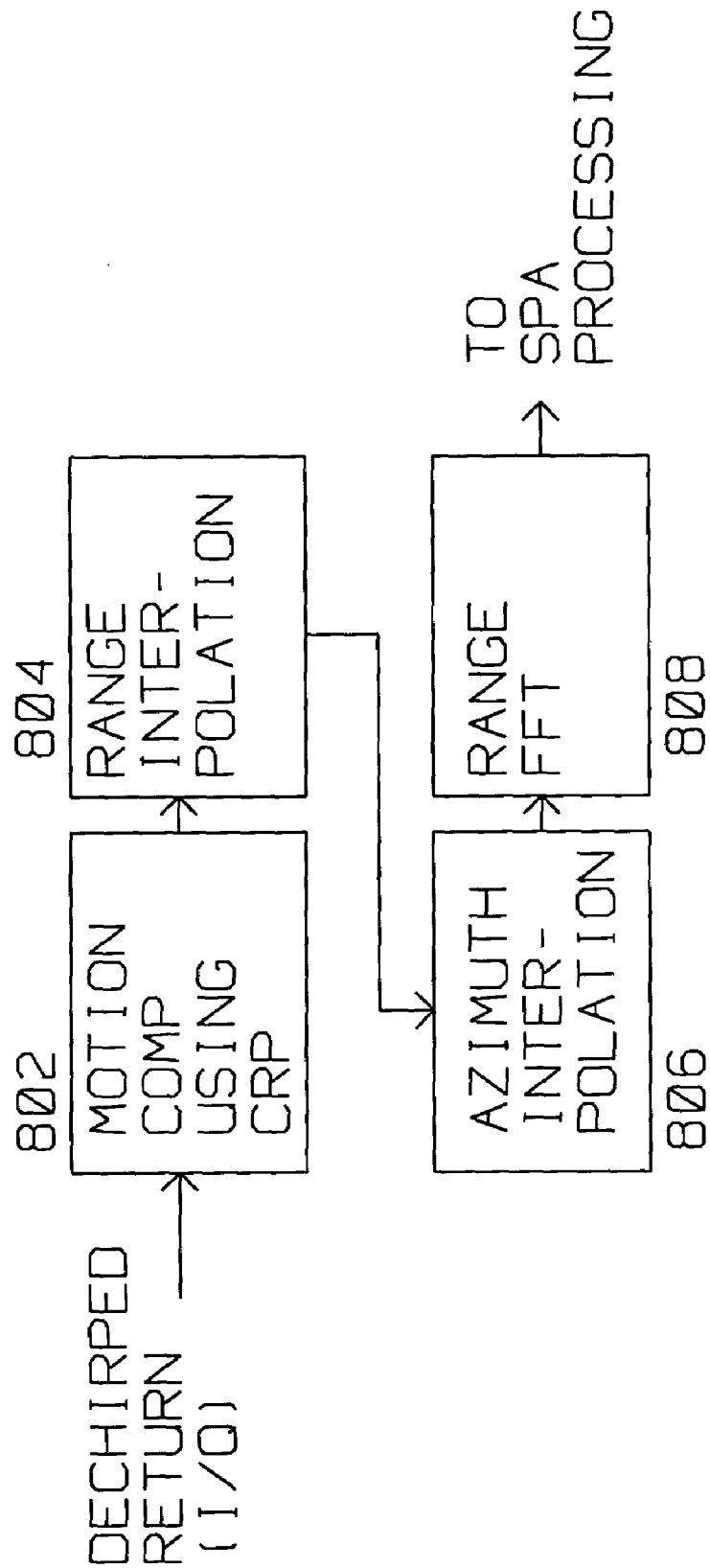
FIG. 8 shows the use of the Polar Format Algorithm (PFA) as used herein.

The processing sequence for PFA is shown in FIG. 8. Input to PFA is (range compressed) dechirped return I/Q radar data. Range deskew function is typically not required for PFA image for a relatively small AF image. Motion Compensation Using CRP 802 motion compensates radar data using the central reference point (CRP) found as outlined in FIG. 6. Range interpolation 804 and Azimuth interpolation 806 are performed using a polyphase filter as described in Reference 1. Range FFT 808 produces range bin data with spatial frequencies in Azimuth. The output from Range FFT 808 is input to SPA as described in the parent of this CIP application.

4. Merging Phase Error Estimates from Overlapping, Adjacent (AF) Arrays.

Figure 9:
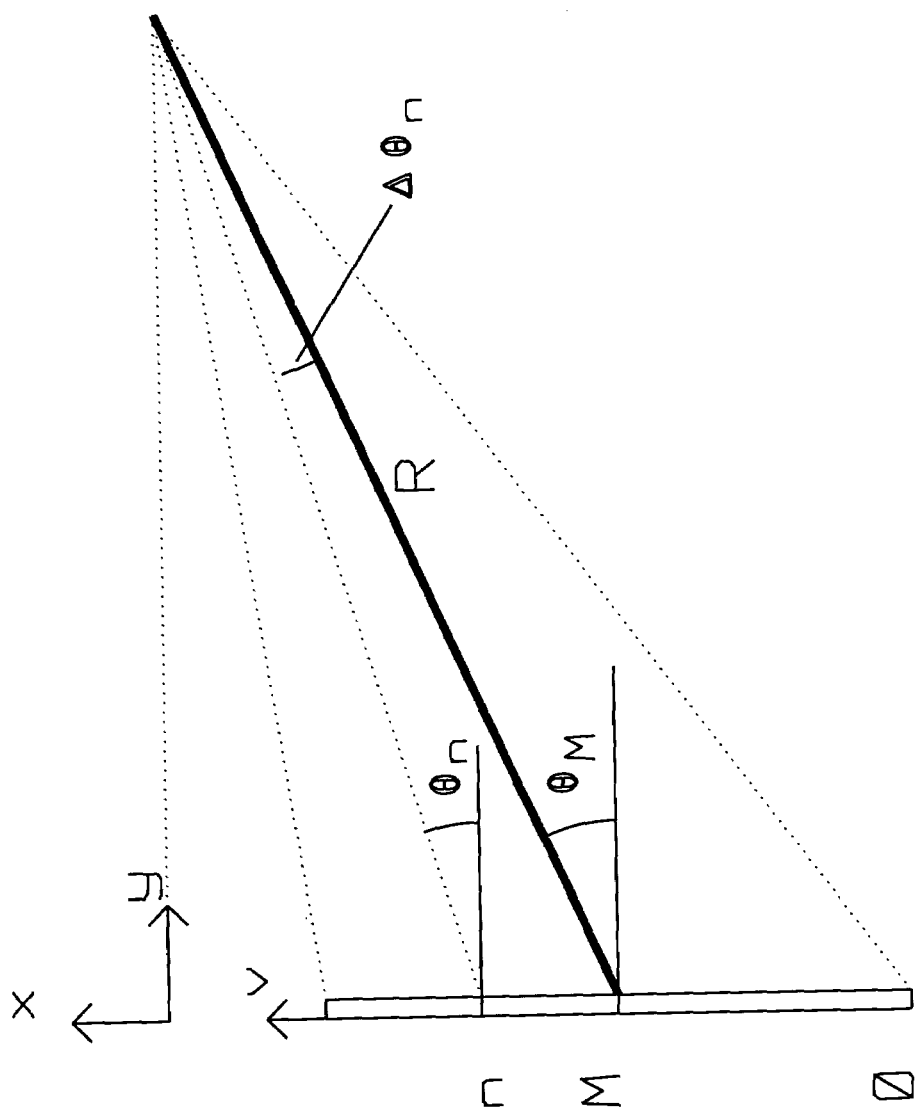
FIG. 9 shows the geometry used in computing Azimuth frequency.
Figure 10:
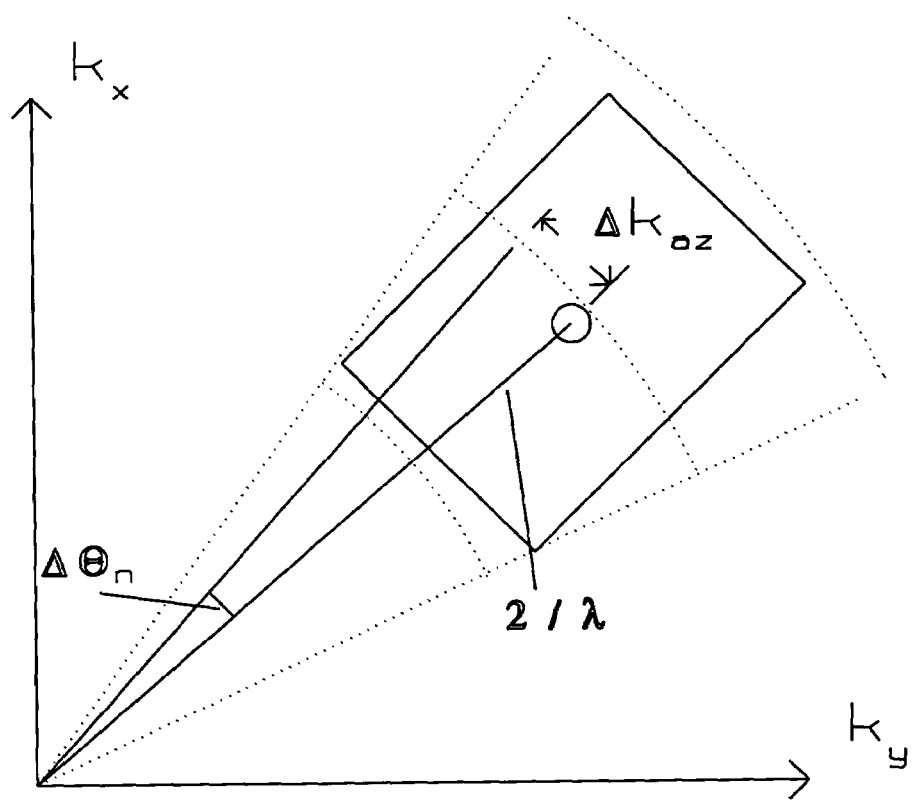
FIG. 10 shows the Azimuth Frequency Domain geometry.

Phase error estimated for best contrast is calculated in accordance with section 3 supra using data uniformly sampled in azimuth frequency. To compute a composite phase error that is to be applied to the pulses descriptive of a patch from a separate phase error computed for each Af array, a phase error is computed for each pulse using the Legendre Polynomial that characterizes the phase error in each AF array. Azimuth frequency corresponding to each pulse is computed using the following expression based on the geometry shown in FIG. 9, where M is the mid array point that divides the SAR collection angle equally.

$$\tan\Delta\theta_n = \tan(\theta_n - \theta_M) = \frac{\tan\theta_n - \tan\theta_M}{1 + \tan\theta_n \tan\theta_M}$$

where $$\tan\theta_n = \frac{R \cdot \cos\psi_m \sin\theta_M - (n - M) \cdot v \cdot PRI}{R \cos\psi_M \cos\theta_M}$$

Here,
$\theta_M$ is the squint angle at mid array point M
$\theta_n$ is the squint angle at pulse n
$\psi_M$ is the grazing angle at mid array point M
PRI is the pulse repetition interval (PRI).

The phase error for each pulse is computed using the polynomial with the coefficients obtained in section 3 at the azimuth frequency corresponding to the pulse that is related by $$\Delta k_x = \frac{2}{\lambda}\tan(\Delta\theta_n)$$

for pulse n.

Next, the adjacent phase error estimates are smoothly connected by computing a linear phase that will bring them into relative phase proximity.

The preferred embodiment of this procedure teaches away from the prior art. In a typical approach, second order derivatives of the phase array error is characterized by a Legendre Polynomial and averaged over the overlap portion $N_{OV}$. This is followed by performing double integration to compute the phase error to be applied to the (overall) patch. This however, would not function here because the second order derivative around the edges of the estimated phase tends to fluctuate severely, precluding stable results when combined with adjacent estimated phases. Thus this prior art approach would fail.

Figure 11:
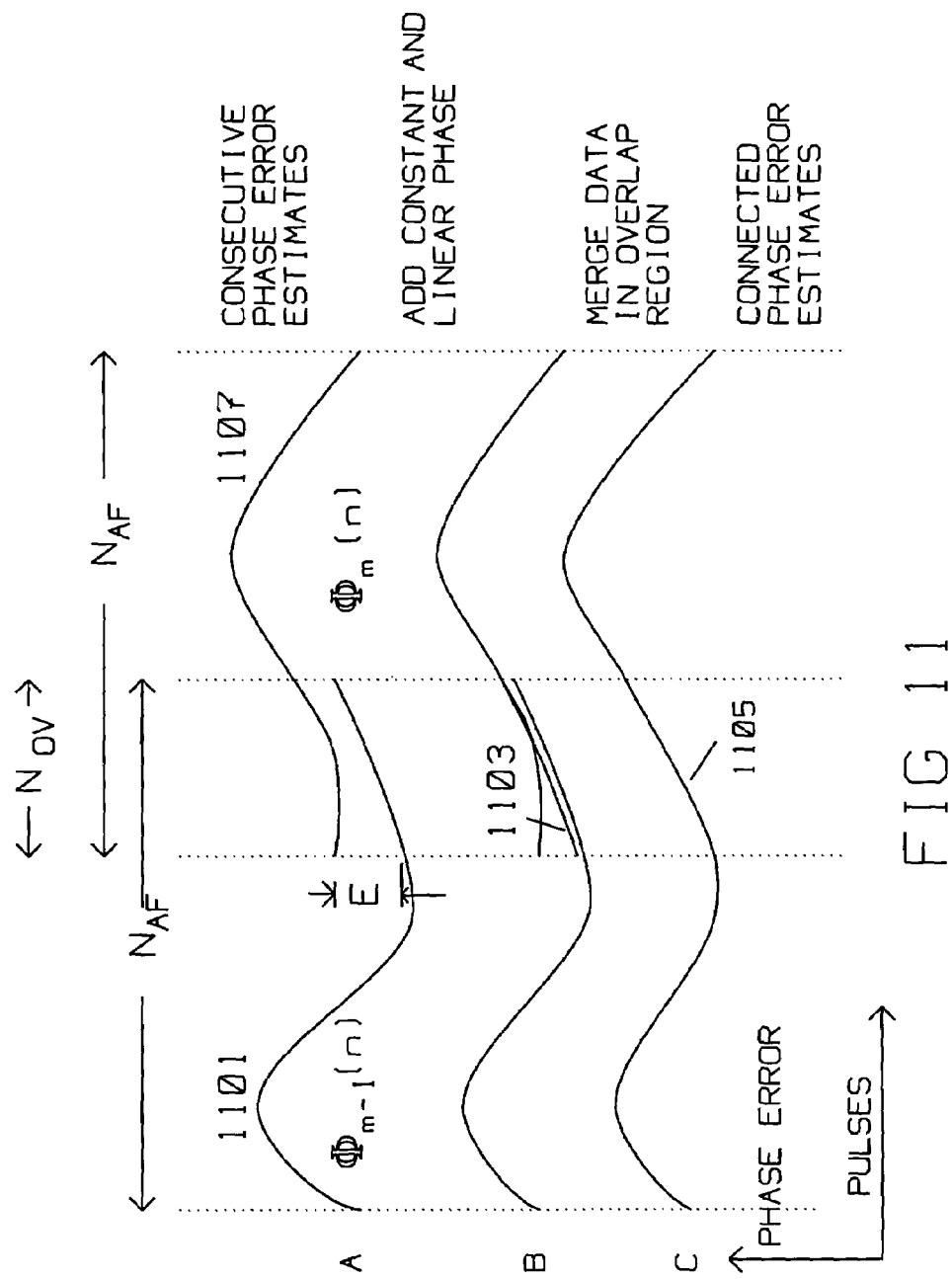
FIG. 11 shows the phase relationship between two overlapping arrays and adjustments made in the overlap region.

In contrast, the preferred embodiment computes an optimizing (linear) phase by fitting separate phase error estimates from each array in the overlap region $N_{OV}$ using a least square criterion by adding linear and constant phase terms, as shown in FIG. 11. Here, phase error estimate 1101, $\Phi_{m-1}(n)$ is separated from adjacent phase estimate 1107, $\Phi_m(n)$ by a phase difference E over the overlap interval $N_{OV}$. It is desired to reduce and smooth, thus optimize the phase difference E.

To minimize the phase difference E, a constant and linear phase is introduced so that the phase difference E is minimized between first phase error estimate 1101 and second error estimate 1107 over the overlap region $N_{OV}$. The constant and linear phase calculated below is an optimizing phase to be added to the second error estimate 1107 that will minimize the phase difference E using a least square criterion. Denote $\Phi(n)$ the estimated phase error for the array m and pulse index n=0, 1, ... $N_{AF}-1$ for $N_{AF}$ pulses in each AF array with $N_{OV}$ pulses overlapped. The phase difference E between two phase errors in the overlapped region $N_{OV}$ is $$\Delta_m\Phi(n)=\Phi_{m-1}(N_{AF}-N_{OV}+n)-\Phi_m(n)$$

for n=0, 1, ... $N_{OV}-1$

Coefficients $\alpha_0$ and $\alpha_1$ in the linear function $$f_m(n)=\alpha_0+\alpha_n$$

that approximates $\Delta\Phi_m(n)$ using a least square optimizing criterion are calculated as follows:

$$a_1 = \frac{6\sum_{n=0}^{N_{OV}-1} n \cdot \Delta\Phi_m(n)}{N_{OV}(N_{OV}+1)(2N_{OV}+1)}$$

$$a_2 = \frac{\sum_{n=0}^{N_{OV}-1} \Delta\Phi_m(n)}{N_{OV}} - a_1\left(\frac{N_{OV}-1}{2}\right)$$

Then, $\Phi_m'(n)$ the updated, shifted phase is generated by adding the linear phase computed using $f_m(n)$. Thus $$\Phi_m'(n) = \Phi_m(n) + f_m(n)$$

for n=0, 1, 2 . . . $N_{AF}$–1.

Next, the data in adjacent arrays is merged for gradual, smooth phase transition from array to array, forming the SAR image of the patch. The phase $\Phi_m^{SMOOTH}(n)$ to be used over the arrays considered:

$$\Phi_m^{SMOOTH}(n) = A_n \cdot \Phi_{m-1}(N_{AF}-N_{OV}+n) + (1-A_N) \cdot \Phi_m'(n)$$

where $$A_n = \frac{N_{OV}-1-n}{N_{OV}-1}$$

for n=0.1.2, . . . , $N_{OV}$–1

There are no changes in the non-overlapped portions of the arrays. That is, $$\Phi_m^{SMOOTH}(n) = \Phi_m'(n)$$

for n=$N_{OV}$, $N_{OV}$+1 . . . $N_{AF}$

Repeating this process for all arrays, updated $\Phi_M^{SMOOTH}$ is used as the first array to determine the linear phase that is to be added to $\Phi_{m+1}(n)$ for adjusting and merging phase data in the next overlapped region.

When the linear phase adjustment and merging of all arrays (AF segments) is completed, smoothly connected phase error is applied to compensate all array data for a patch. To eliminate the image shift that is caused by the application of the linear phase adjustment, the linear component is removed from the composite phase for the first patch. Phase merging between arrays of consecutive patches is done similarly based on the overlap ratio between the last AF array in the preceding data take and the first AF array in the current data take.

Figure 12:
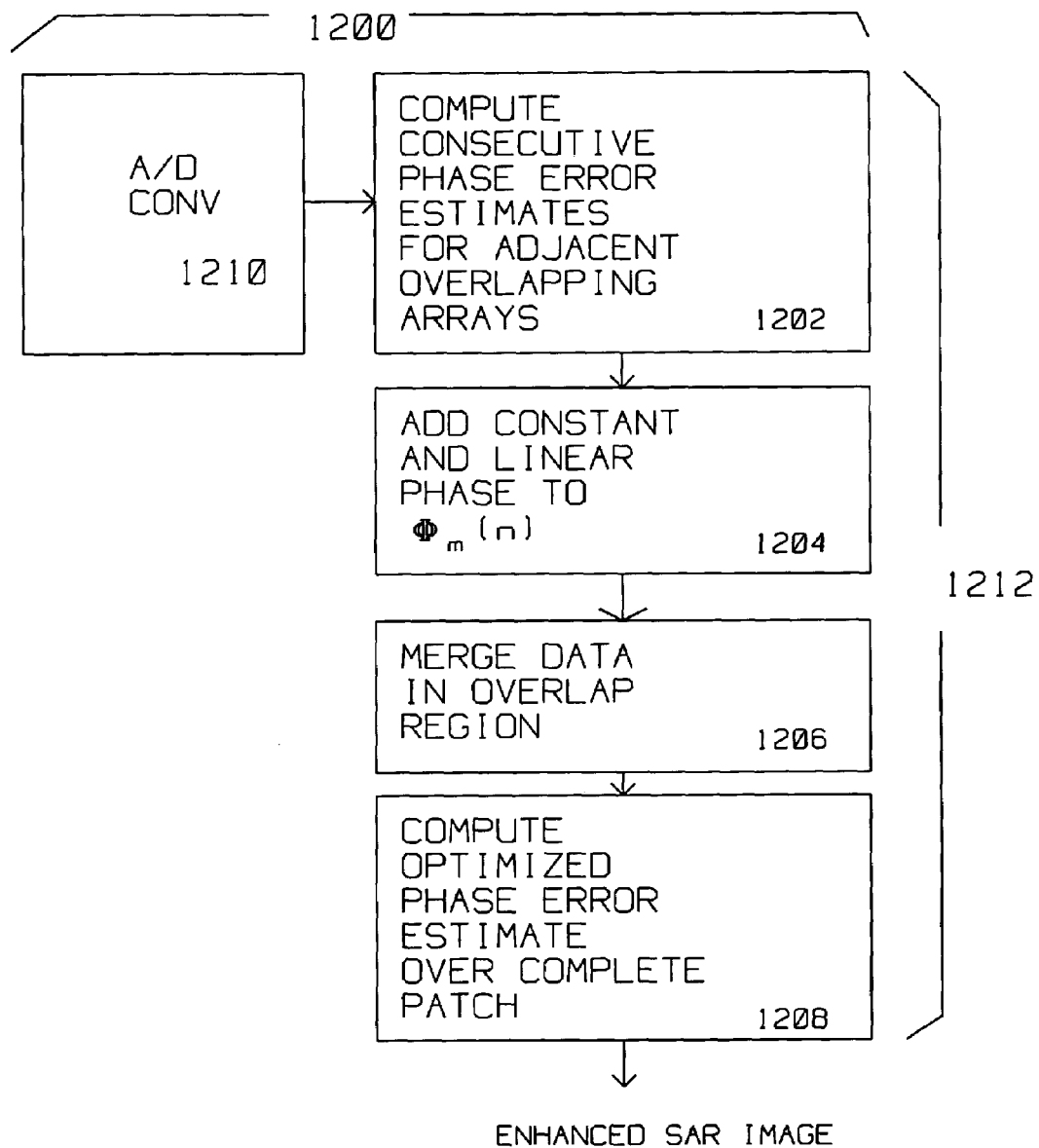
FIG. 12 shows the apparatus and method steps used to merge data in overlap between arrays.

A summary of the apparatus and method described herein is further detailed in FIG. 12. Analog to digital converter 1210, part of radar 1200, generates digital data to be processed within computer 1212. Compute Phase Error Estimates for adjacent overlapping arrays 1202 locates a first strong scatterer within a first digital array and also locates a second strong scatterer within a second digital array while motion compensating said first digital array with respect to platform motion during said first digital array and said first strong scatterer to obtain a motion compensated first digital array. Motion compensation is performed on the second digital array to obtain a motion compensated second digital array.

The first digital array is autofocussed to obtain a first phase error estimate over said first digital array, and the second digital array is also autofocussed to obtain a second phase error estimate over the second digital array.

Add Constant and Linear Phase 1204 adds an optimizing phase to the second error estimate to obtain a shifted error estimate for said second array.

In Merge Data in Overlap Region 1206 the first phase error estimate is merged to the shifted error estimate over the overlap region to obtain a connected phase error estimate.

Compute Optimized Phase Error Estimate Over Complete Patch 1208 applies the connected phase error estimate to the motion compensated first digital array and the motion compensated second digital array to compute an enhanced SAR image of the patch covered by the first and second digital array.

All references cited in this document are incorporated herein in their entirety by reference.

Although presented in exemplary fashion employing specific embodiments, the disclosed structures are not intended to be so limited. For example, although the optimization herein is described in the context of a radar system, it is also applicable for sonar, or similar imaging methods, where an image of scatterers is extracted from coherent summing of a plurality of phase accurate returns.

Those skilled in the art will also appreciate that numerous changes and modifications could be made to the embodiment described herein without departing in any way from the invention.

The invention claimed is:

1. A radar for generating a search mode synthetic aperture image of a patch from periodic pulse returns reflected from said patch, said radar having a motion, a first number of said periodic pulse returns reflected from a first array and a second number of said periodic pulse returns reflected from a second array, said first array overlapping said second array by an overlap, said first array and said second array covering said patch, said radar comprising:

analog to digital converter for converting said pulse returns from said first array into a first digital array having first range bins and from said second array into a second digital array having second range bins;

a computer for:

locating a first strong scatterer within said first digital array;

locating a second strong scatterer within said second digital array;

motion compensating said first digital array with respect to said motion during said first digital array and said first strong scatterer to obtain a motion compensated first digital array;

motion compensating said second digital array with respect to said motion during said second digital array to obtain a motion compensated second digital array;

autofocussing said motion compensated first digital array to obtain a first phase error estimate over said first digital array;

autofocussing said motion compensated second digital array to obtain a second phase error estimate over said second digital array;

adding an optimizing phase to said second error estimate to obtain a shifted error estimate for said second array;

merging said first phase error estimate and said shifted error estimate over said overlap to obtain a connected phase error estimate;

applying said connected phase error estimate to said motion compensated first digital array and said motion compensated second digital array to compute an image of said patch.

2. A radar system as described in claim 1 wherein said first strong scatterer is located by computing a first range bin power for each said first range bins within said first digital array and choosing one of said first range bins having the highest first range bin power among said first range bins.

3. A radar system as described in claim 2 wherein said second strong scatterer is located by computing a second range bin power of each second range bins within said second digital array and choosing one of said second range bins having the highest second range bin power among said second range bins.

4. A radar system as described in claim 3 wherein said optimized phase minimizes the difference between said first error estimate and said second error estimate over said overlap using a least square criterion.

5. A radar system as described in claim 4 wherein said overlap contains a third number of pulses in said first array, and said third number of pulses in said second array.

6. A radar system as described in claim 5 wherein said third number of pulses contained in said overlap is 10 percent or more of said first number of pulses contained in said first array.

7. A method for generating a search mode synthetic aperture image of a patch from periodic pulse returns reflected from said patch using a radar, said radar having a motion, a first number of said periodic pulse returns reflected from a first array and a second number of said periodic pulse returns reflected from a second array, said first array overlapping said second array by an overlap, said first array and said second array covering said patch, said method comprising the steps of:
  converting said pulse returns from said first array into a first digital array having first range bins and from said second array into a second digital array having second range bins using an analog to digital converter;
  locating a first strong scatterer within said first digital array;
  locating a second strong scatterer within said second digital array;
  motion compensating said first digital array with respect to said motion during said first digital array and said first strong scatterer to obtain a motion compensated first digital array;
  motion compensating said second digital array with respect to said motion during said second digital array to obtain a motion compensated second digital array;
  autofocussing said motion compensated first digital array to obtain a first phase error estimate over said first digital array;
  autofocussing said motion compensated second digital array to obtain a second phase error estimate over said second digital array;
  adding an optimizing phase to said second error estimate to obtain a shifted error estimate for said second array;
  merging said first phase error estimate and said shifted error estimate over said overlap to obtain a connected phase error estimate;
  applying said connected phase error estimate to said motion compensated first digital array and said motion compensated second digital array to compute an image of said patch.

8. A method as described in claim 7 wherein said first strong scatterer is located by computing a first range bin power for each said first range bins within said first digital array and choosing one of said first range bins having the highest first range bin power among said first range bins.

9. A method as described in claim 8 wherein said second strong scatterer is located by computing a second range bin power of each second range bins within said second digital array and choosing one of said second range bins having the highest second range bin power among said second range bins.

10. A method as described in claim 9 wherein said optimized phase minimizes the difference between said first error estimate and said second error estimate over said overlap using a least square criterion.

11. A method as described in claim 10 wherein said overlap contains a third number of pulses in said first array, and said third number of pulses in said second array.

12. A method as described in claim 11 wherein said third number of pulses contained in said overlap is 10 percent or more of said first number of pulses contained in said first array.

* * * * *